United States Patent

Pento

[15] 3,671,875

[45] June 20, 1972

[54] DIGITALLY OPERATED SIGNAL REGENERATOR AND TIMING CIRCUIT

[72] Inventor: Frank Louis Pento, Colts Neck, N.J.

[73] Assignee: Bell Telephone Laboratories, Incorporated, Murray Hill, N.J.

[22] Filed: May 20, 1971

[21] Appl. No.: 145,290

[52] U.S. Cl. ....................328/129, 178/16 E, 178/70 R, 307/234, 307/293, 328/44, 328/164

[51] Int. Cl. ....................H03k 17/26

[58] Field of Search ....................178/16 E, 70 R; 307/234, 293; 328/44, 111, 112, 129, 164

[56] References Cited

UNITED STATES PATENTS

| | | | |
|---|---|---|---|
| 3,312,784 | 4/1967 | Draper, Jr. | 179/16 E |
| 3,452,220 | 6/1969 | Fritschi | 179/16 E |
| 3,544,724 | 12/1970 | Pento | 179/16 E |

*Primary Examiner*—Donald D. Forrer
*Assistant Examiner*—R. C. Woodbridge
*Attorney*—R. J. Guenther and Edwin B. Cave

[57] ABSTRACT

A digitally operated signal timing circuit employs a single synchronous up-down counter with overriding set and reset in combination with a group of flip-flops and logic gates. In effecting the regeneration of input pulses, such as the pulses produced by a telephone dial, a plurality of signal timing functions are provided by the combination indicated, which functions include the establishment of an operate threshold delay, a release delay, a minimum output pulse duration, a minimum duration interval between pulses and an idle condition holdover period.

5 Claims, 11 Drawing Figures

INVENTOR
F. L. PENTO
BY [signature]
ATTORNEY

DIGITALLY OPERATED SIGNAL REGENERATOR AND TIMING CIRCUIT

BACKGROUND OF THE INVENTION

1. Field of the Invention

This invention relates to signal correcting and regeneration circuits and, more particularly, to circuits of this type which provide a plurality of interrelated timing functions.

2. Description of the Prior Art

A wide variety of electronic control systems and communication systems employ energizing signals or pulses which are required to conform, within specified limits, to quantitative characteristics such as duration, spacing, level and repetition rate. In such systems, it is common practice to employ pulse correcting circuitry to ensure that the signals are of the proper form and fall within the allowable characteristic limits before being relayed or transmitted on to their final point of utilization, which may, for example, be a telephone switching system.

Conventional signal processing apparatus of the type used to distinguish valid from invalid signals and to regenerate valid signals which may have developed undesirable aberrations generally employs analog techniques which often require circuits of undue cost and complexity. Moreover, this requirement is accentuated by those prior art circuit arrangements that employ a memory capability. Still another undesirable aspect of known pulse correcting systems is the common requirement for a plurality of timing circuits, each designed to perform a separate but related timing function. Illustrative of such a system is that disclosed by F. L. Pento in U.S. Pat. No. 3,544,724, issued Dec. 1, 1970, where pulse correction is achieved through the use of a plurality of substantially identical timers including an operate timer, a release timer, a make timer and a break timer, each designed to analyze the corresponding pulse input characteristics and to introduce the required corrections. Some simplification is achieved in a system disclosed by B. R. Savage in his U.S. Pat. application, Ser. No. 87,851, filed Nov. 9, 1970, which employs a pair of digital counters and a pair of timing clock control signal sources to reform pulses. That system, however, is directed primarily to the maintenance of a constant percent pulse break characteristic.

The general object of this invention is to reduce the complexity and cost and to enhance the accuracy and dependability of pulse correcting arrangements.

SUMMARY OF THE INVENTION

The stated object and related objects are achieved in accordance with the principles of the invention by the employment of simplified digital techniques in the performance of all of the required timing and logic operations involved in a group of pulse timing functions which include operate threshold delay, release delay, minimum break, minimum make and idle condition holdover. Specifically, a pulse regeneration or pulse correcting system in accordance with the invention utilizes a single synchronous, up-down, multifunction counter with overriding set and reset in combination with flip-flops and logic gates. An important aspect of the invention is that a system of this type is suitable for use as part of a single frequency transmitter or a single frequency receiver and, therefore, can accept dial pulse signals which originate as loop signals or as detected single frequency tone pulses.

In accordance with another important aspect of the invention, an embodiment may be arranged to provide both transmitter and receiver pulse corrections as well as supervisory timing control functions such as band-elimination, filter insertion, broadbanding of the receiver, high level tone transmission and transmission path cut insertion.

One particularly desirable characteristic of the circuitry employed in implementing the principles of the invention is its compatibility with integrated circuit fabrication techniques.

A basic feature of the invention is that most circuit blocks including the basic counter and primary logic combinations are used for more than one function. The number of packages needed for medium or large-scale integration is thus held to a desirably low level. FOr example, as indicated above, the receive and transmit pulse corrector circuits are identical in all respects so that two such circuits may be used per single frequency (SF) unit. The supervisory control and timing circuits are also used in the transmitter as well as in the receiver and, accordingly, only two of these circuits are needed per SF unit.

DETAILED DESCRIPTION

Figure 1A:
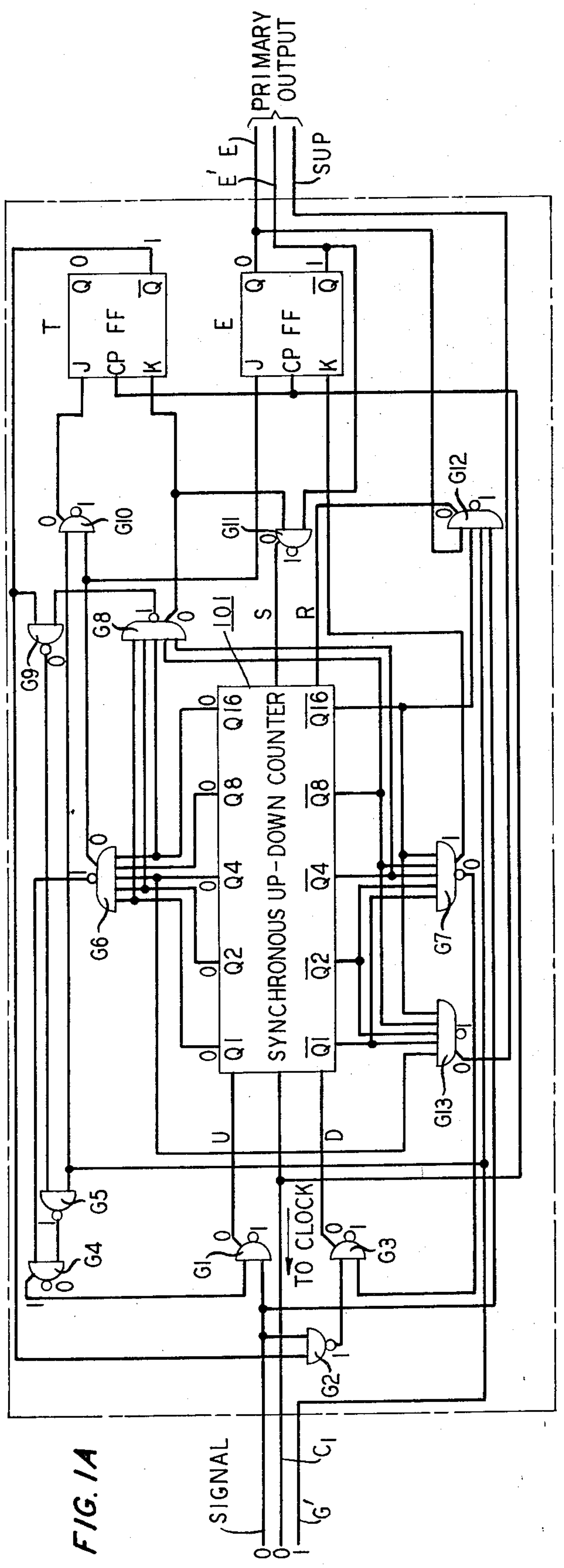
FIG. 1A is a schematic block diagram of a circuit in accordance with the invention.

In the circuit of FIG. 1A all of the time intervals are generated by a synchronous, up-down, digital counter 101 which is driven by a clock, not shown, the signals from which are applied to the $C_1$ terminal. One suitable frequency for the clock signal is 650 Hz since that figure is a submultiple of 2,600 Hz and can therefore be easily derived from the conventional 2,600 Hz oscillator which is employed for SF tone signals. With this arrangement the timing accuracy may be held to within ±1.5 milliseconds. If improved accuracy is desired, the clock frequency can be increased to the next higher submultiple of 2,600 which is 1,300 Hz. A disadvantage of employing the higher frequency, however, is that a six-stage counter rather than a five-stage counter would be required and, additionally, the gates G6, G7 and G8 would require six instead of five inputs. An accuracy of ±1.5 milliseconds corresponds to ±5 percent on the minimum timed signal of 30 milliseconds which represents greater accuracy than most analog timers in commercial telephone use.

Figure 2:
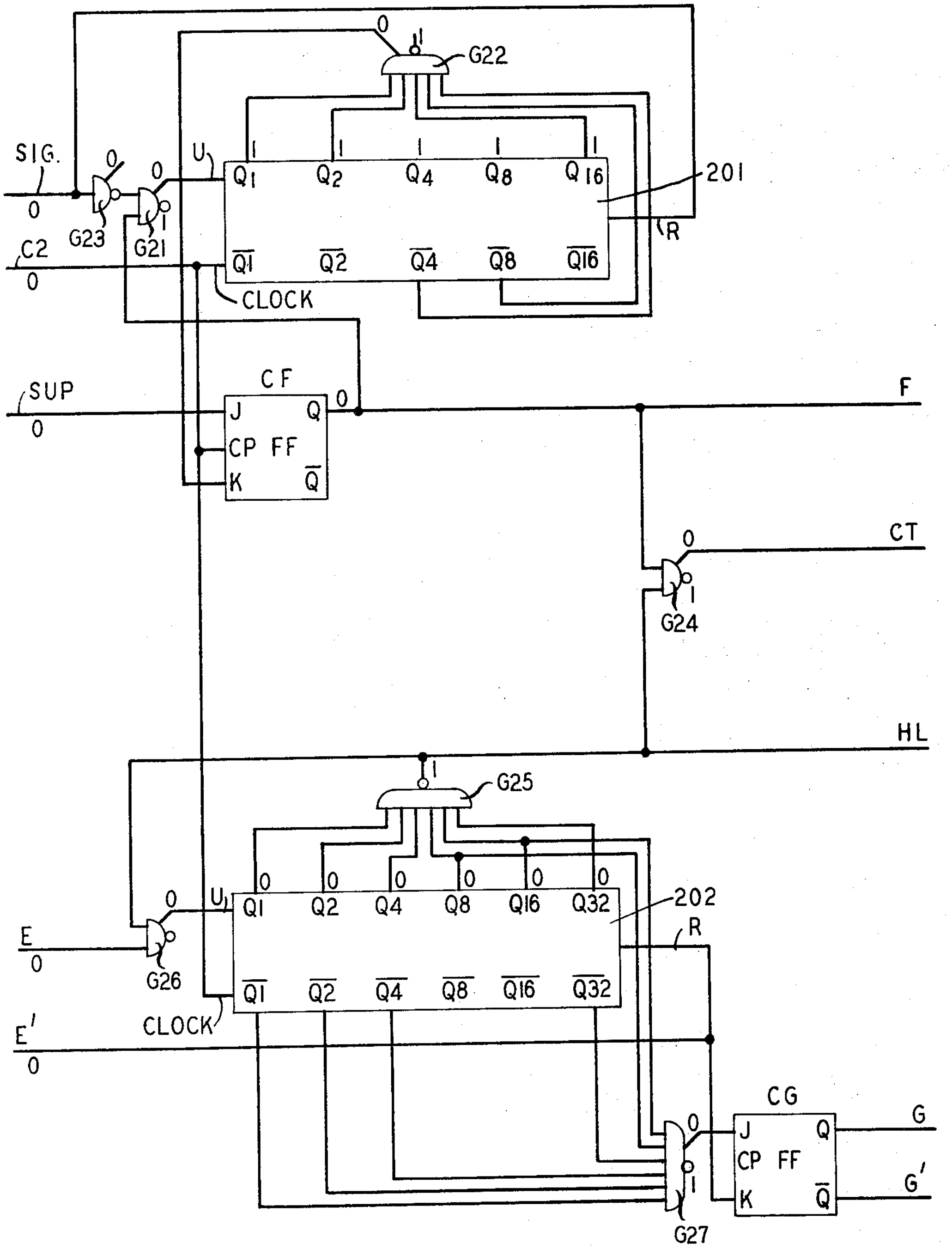
FIG. 2 is a schematic block diagram of a supervisory timing control circuit in accordance with the invention; and each of the FIGS. 3 through 10 is a plot of a particular input waveform and the corresponding output waveform generated by a circuit in accordance with the invention.

The SIG lead is the signal input lead and in a complete system would be the output of a signal guard comparator, of the type shown in the Pento patent cited above, of the circuit were used as a part of an SF receiver, or a so-called "M" lead if the circuit were used as a part of an SF transmitter. The SIG lead is in the high voltage condition (is high) if SF tone is on or if the M lead is grounded (on-hook). The SIG lead is low when SF tone is off or when the M lead is at minus 48 volts (off-hook). The G' lead is derived as shown by the circuit of FIG. 2. When this lead is low, it is an indication that the circuit is in the idle condition (SF tone is on for at least 192 milliseconds) and increased holdover (broadband) is required (50 milliseconds). The primary output of the timer is applied to the E lead and the on-hook condition is indicated by a high E lead. The SUP lead provides supervisory control information to the circuit shown in FIG. 2 to activate the band-elimination filter insertion function or precut function depending on whether the circuit is part of a receiver or transmitter respectively. These functions are described and illustrated in detail by the Pento patent cited above.

Figure 1B:
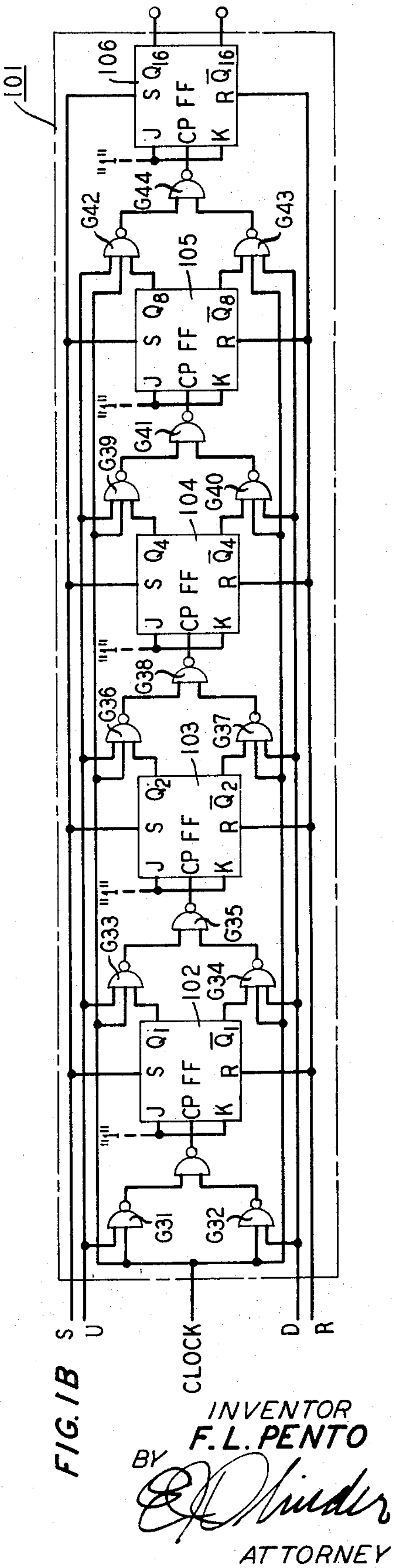
FIG. 1B is a schematic circuit diagram, partially in block form, of the synchronous up-down counter shown entirely in block form in FIG. 1A.

The basic gate configuration for each of the gates G1 through G13 of FIG. 1A and for each of the gates G31 through G44 of FIG. 1B is that of a NAND gate having a complementary output. Each of the flip-flops T and E of FIG. 1A and 102 through 106 of FIG. 1B are of the conventional J–K type, and the counter 101 is a conventional synchronous up-down counter with overriding set and reset controls. Details of the counter 101 are as shown in FIG. 1B.

As a preface to a detailed discussion of the sequential operation of the circuit shown in FIGS. 1A and 1B, reference will be made at this point to the signal plots of FIGS. 3 through 10 which serve to illustrate the overall functions performed by these circuits.

Figure 3:
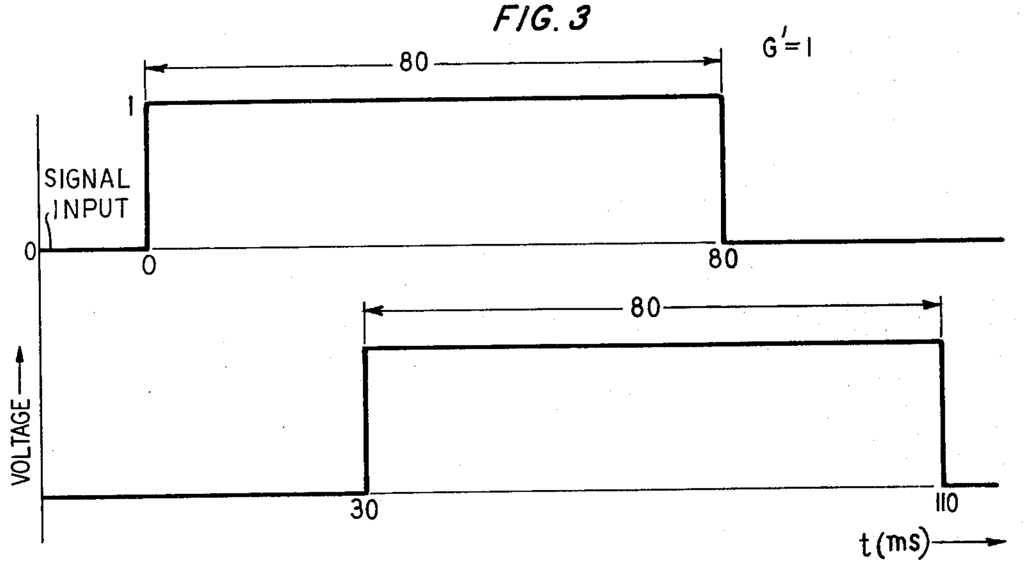

FIG. 3 shows an input pulse on the SIG lead of 80-millisecond duration with a "1" on the G' lead. Note that the E lead output is delayed by 30 milliseconds but is equal in duration to the input signal.

Figure 4:
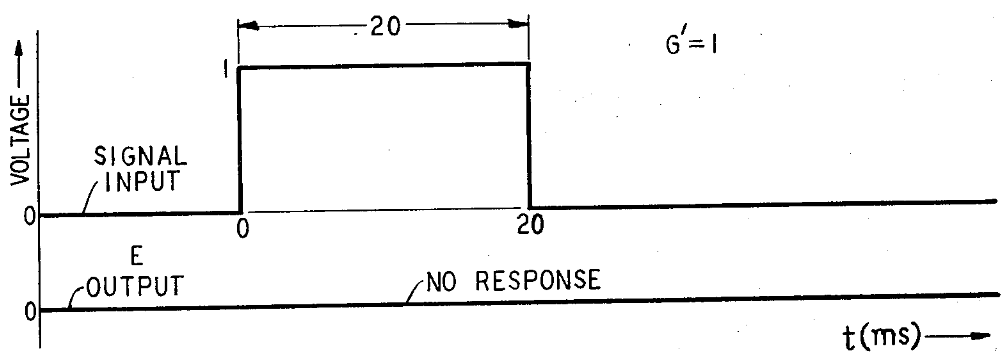

FIG. 4 illustrates the threshold rejection characteristic of the signal timer. As shown, when a 20-millisecond input is applied, no response appears on the E lead. In one embodiment of the invention, the circuit is designed to reject any signal of less than 30 milliseconds duration.

Figure 5:
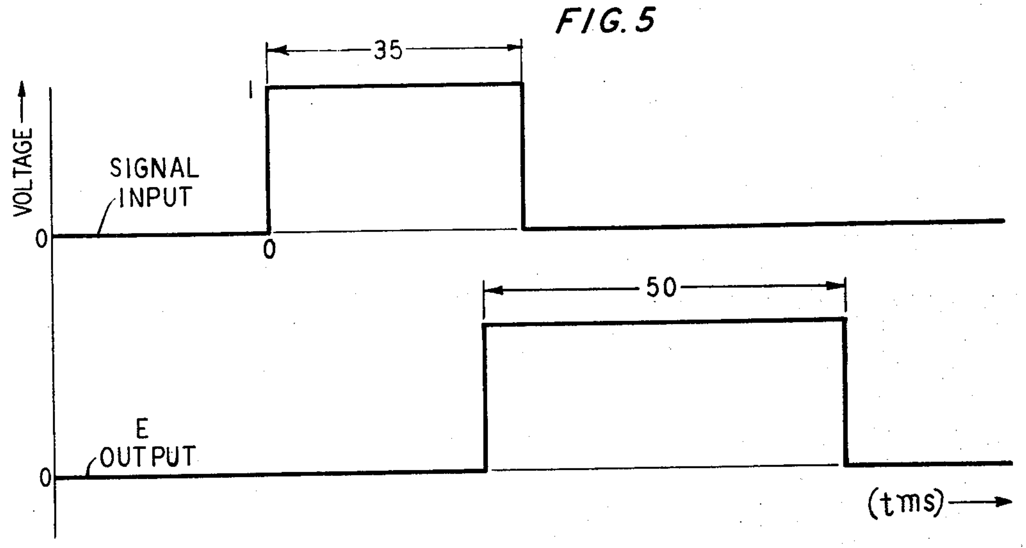

The minimum break feature is illustrated by FIG. 5. A 51-millisecond output is applied to the E lead in response to a 35-millisecond SIG lead input. Although not specifically illustrated, the E lead output is 51 milliseconds for all applied SIG lead inputs between 30 and 51 milliseconds.

Figure 6:
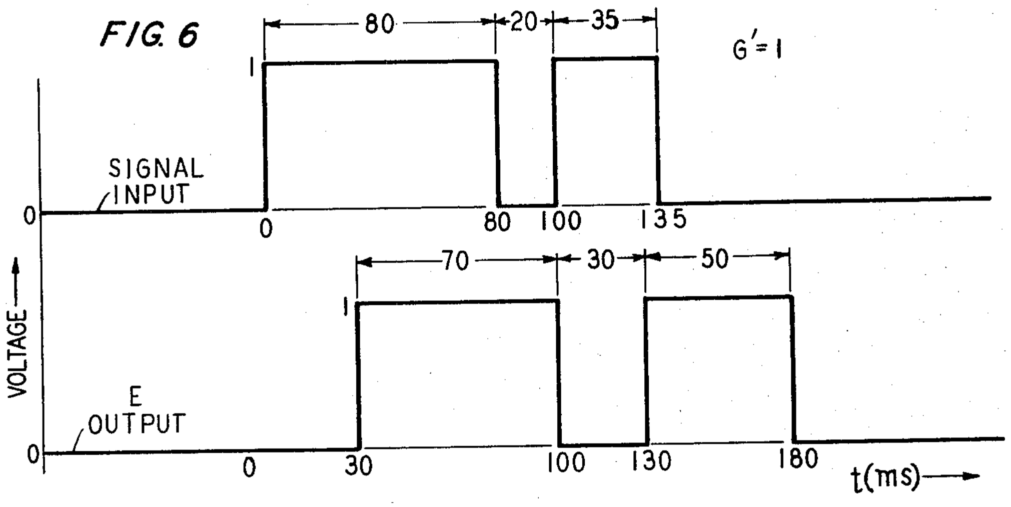

FIG. 6 illustrates the minimum make feature. Note that the 20-millisecond interpulse input is stretched to 30 milliseconds on the E lead. Any interpulse interval less than 30 milliseconds is automatically stretched to 30 milliseconds. Also illustrated in FIG. 6 is input pulsing at 10 pps (100-millisecond period).

Figure 7:
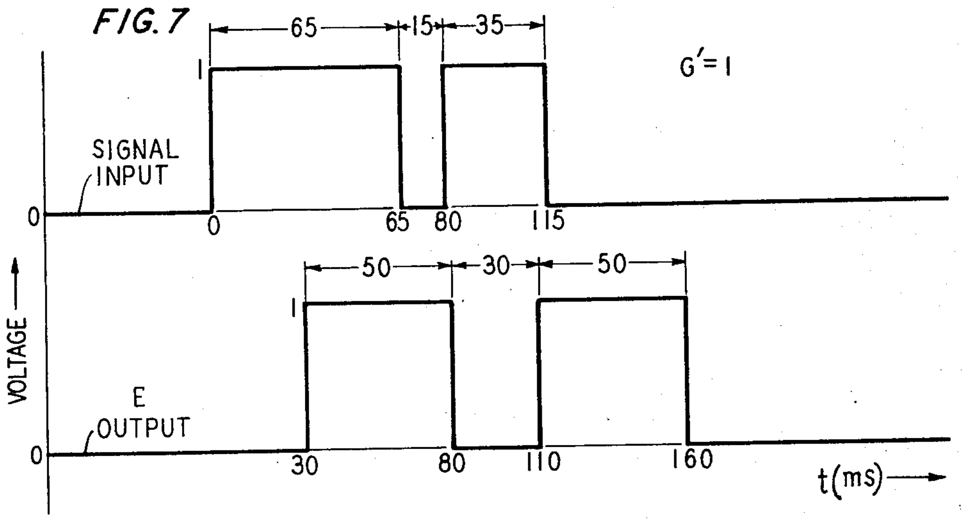

FIG. 7 illustrates input pulsing at 12.5 pps (80-millisecond period). Both the minimum make and minimum break functions are illustrated here.

Figure 8:
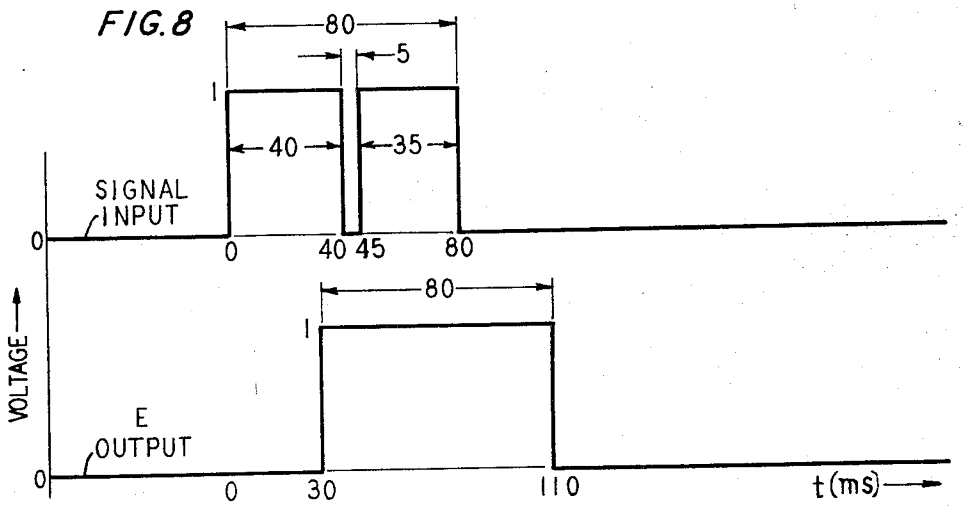

FIG. 8 illustrates how the circuit is immune to a 5-millisecond hole in a signal pulse when the hole occurs after the E lead has gone high.

Figure 9:
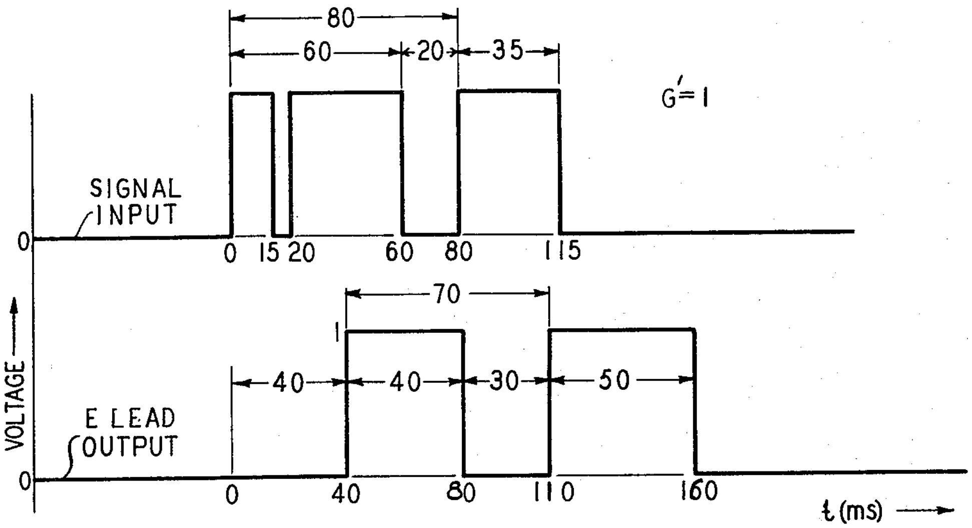

FIG. 9 shows the effect of a five millisecond hole when it occurs prior to a high on the E lead. Note that the operate delay has been increased from 30 milliseconds to 40 milliseconds. The 10-millisecond increase is the result of a five millisecond down-count at the time the hole occurs, followed by a five millisecond up-count after the hole is terminated. It should also be noted that the first period has been shortened from 80 to 70 milliseconds owing to the increased operate delay. Such holes in the input signals may be caused by high level input noise on the carrier facility, although such occurrences are rare.

Figure 10:
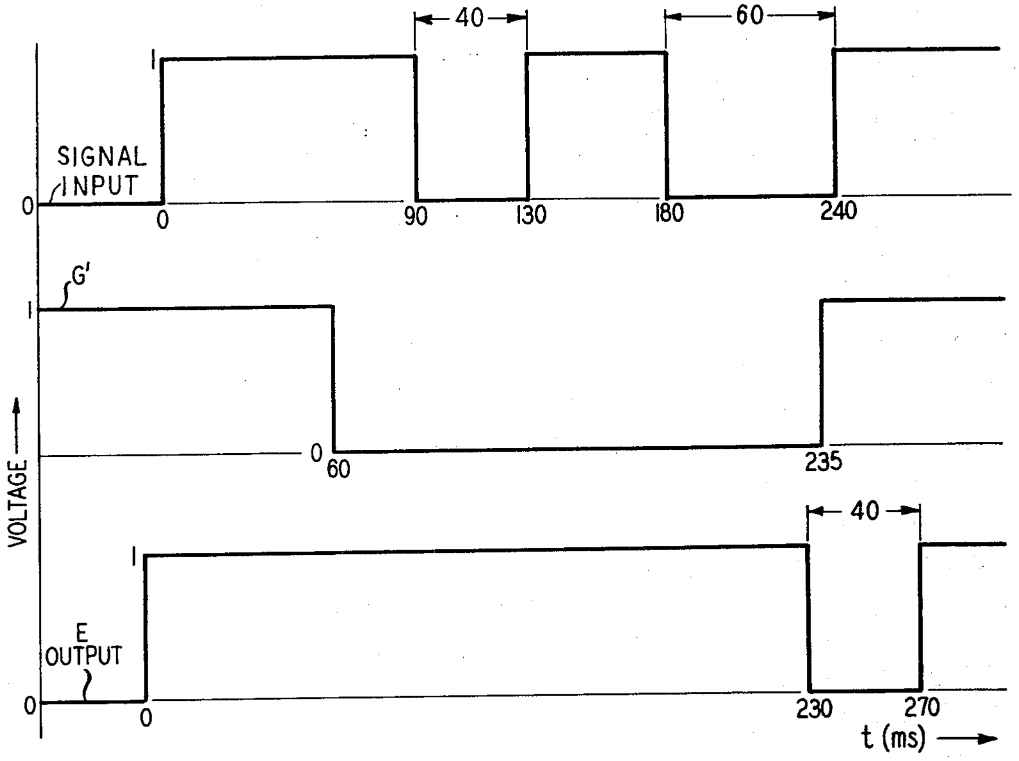

FIG. 10 illustrates the holdover capability of the signal timer when the G' lead is low. Note the 40-millisecond interruption does not cause a response, whereas the 60-millisecond operation does.

DETAILED OPERATION OF THE SIGNAL TIMER OF FIG. 1A

For this description, the SIG and $C_1$ clock leads are assumed to be low and the G' lead high, and all gates and flip-flop states are as shown in FIG. 1A.

Consider first the operating sequence that occurs when the SIG lead goes high, which takes place when there is an on-hook. The U lead of the counter goes high since the gate G4 complement was initially high and therefore the gate G1 complement or U lead goes high. The D lead is initially low owing to gate G7 and remains low because the output of gate G2 goes low, which holds gate G3 complement, or the D lead, low. With the U lead high, the counter begins to up-count with each clock pulse until the count of 19 (30 milliseconds) at which time the output of gate G8 goes low. At this point, the signal has been accepted by the circuit as a valid input. If the signal had gone low prior to the count of 19, then gate G2 and gate G3 complement would go high, activating the D lead, and gate G1 complement would go low, deactivating the U lead so that the counter would down-count until the all-zero state is reached. At this point, the down-counting is stopped, since gate G7 goes low and the complement of gate G3 goes low. Under these conditions, no change occurs on the E lead.

Assume now that the SIG input remains high beyond the count of 19. At the 19 count, gate G8 goes low, gate G9 goes high, gate G5 goes low, gates G4 and G1 complement go low, and the U lead goes low to stop up-counting. The gate G8 complement and gate G11 complement go high, setting the counter to the all-high state, which is equivalent to a count of 32. At this point, gates G6 and G10 complement go high, causing the J leads of both the T and E flip-flops to go high. Gate G8 goes high, but the U lead is held low by gate G6 being low which causes gate G4 and gate G1 complement to remain low to prevent up-counting. Gate G8 complement goes low causing gate G11 complement and therefore the S lead to go low. When the next clock pulse occurs, both the T and E flip-flops set (Q goes high, and $\overline{Q}$ goes low) since the J leads are high and the K leads are low. The K leads are low because gates G7 and G8 complement are low when terminal $\overline{Q}$ of the T flip-flop goes low, gate G2 goes high and gate G3 complement goes high, thereby activating the D lead. Gate G7 is high and remains so until the counter is reset to zero. Note that gate G2 goes high independent of the state of the SIG lead. Therefore, the counter begins to down-count from 32 (50 milliseconds) whether the SIG lead is high or low. The U lead is held low during the down-count by the $\overline{Q}$ output of the flip-flop through gates G9, G5, G4 and G1.

When the count of 19 occurs, gate G8 complement goes high, causing the K lead of the T flip-flop to go high. The J lead is low because gates G6 and G10 complement are low. When the next clock pulse occurs, the T flip-flop is reset ($\overline{Q}$ goes high). This action inhibits down-counting since gate G2 goes low and gate G3 complement goes low. Up-counting will also be inhibited since gate G8 is low, gate G9 is high, gate G5 is low and gates G4 and G1 complement are low. It is possible for the counter to overshoot 19 and go to 18 as the result of a race condition between the counter stages versus the T flip-flop in series with gates G2 and G3. If this overshoot does occur, there is no adverse effect since the next clock pulse will cause an up-count back to 19 at which point the counter is stable. The counter set lead is held low by the $\overline{Q}$ output of the E flip-flop which is low, causing gate G11 complement to be low. The counter remains at 19 until either the SIG lead or the G' lead goes low. Assume the SIG lead goes low first. The D lead then goes high because gates G2 and G3 complement go high and the counter down-counts to zero (30 milliseconds). At the count of zero, gate G7 goes high, preventing further down-counting. The K lead of the E flip-flop goes high, causing it to reset on the next clock pulse which changes the E lead to the low state.

Note that in each case the delay from the high SIG lead to the high E lead and from the low SIG lead to the low E lead is 19 counts or 30 milliseconds. This condition means that the input signal is reproduced faithfully with a 30 millisecond time shift, provided that the input SIG lead is high for longer than 50 milliseconds. Had the SIG lead been high for just slightly longer than the 30-millisecond recognition interval, then the release time would have been 50 milliseconds, since the counter was immediately set to 32 after reaching the count of 19. For single pulse inputs between 30 and 50 milliseconds, the E lead high interval is stretched to 50 milliseconds. This function is called the minimum break interval. For single pulses greater than 50 milliseconds but less than the time where the G' lead changes state (192 milliseconds), inputs are reproduced without distortion.

Assume now that the SIG lead remains high long enough so that the G' lead changes state and goes low. The counter had previously up-counted to 19, set to 32 and down-counted back to 19 and stopped. If the SIG lead remains high and the G lead goes low, the U lead goes high, since gate G5 goes high and gates G4 and G1 complement go high. The counter 101 up-counts to 32, at which point gate G6 goes low, causing gates G4 and G1 complement to go low thus stopping the up-count. The T flip-flop cannot activate the D lead since gate G10 is inhibited by the low G' lead. When the SIG lead finally goes low, the counter 101 down-counts from 32 to 50 milliseconds straight to zero with no interruption at the 19 count. When the counter 101 gets to zero, the E flip-flop is reset and the G' lead goes high as will be described below in the discussion of the circuit of FIG. 2. The 50-millisecond release time provides a 50-millisecond immunity to interruption in SF tone. If this circuit were to be used as a transmitter, the G' lead would not be connected since the holdover feature is not needed.

Thus far, the detailed operational description of the circuit of FIG. 1A has been directed to the operate and release delay functions and the minimum break and idle condition holdover functions. The remaining timing feature or function, that of minimum break, can best be described by considering the SIG lead transition from high to low and back to high where the low condition exists for less than 30 milliseconds (the G' lead is high). When the SIG lead goes low, the counter begins to down-count from 19 towards zero. If the SIG lead goes high again before the counter reaches zero, then gate G12 complement goes high, resetting the counter to zero which in turn causes the E flip-flop to reset. The counter therefore must begin to count from zero up to 19 before the E flip-flop can be set again. This action automatically injects a minimum 30-second interval between pulses. For the minimum make feature to be operative, the SIG lead must be low for the time it takes to count down from 19 to 15 or about 6 milliseconds. This result is effected by connecting the Q16 output of the counter to gate G12 to inhibit this gate unless Q16 is low. Gate G12 is also inhibited by the G' lead when it is low to remove the minimum make feature during the idle condition when it is needed.

DETAILED OPERATION OF THE TIMING CONTROL CIRCUIT OF FIG. 2

FIG. 2 illustrates a supervisory timing control circuit in accordance with the invention which contains the control leads for the following functions:

1. band-elimination filter insertion (F lead);
2. broadbanding of the receiver (G lead);
3. transmit path cut insertion (CT lead); and
4. high level tone transmission (HL lead). The functions themselves are conventional and are well known in the art, as disclosed in the Pento patent cited above.

The F and G leads shown in FIG. 2 are for receiver functions, whereas the CT and HL leads are for transmitter functions. This timing circuitry employs two up-counters 201 and 202, two J–K flip-flops CF and CG and logic gates G21 through G27. The clock applied to lead C2 is typically set for 125 Hz. This low clock speed is required in order to generate the long supervisory time intervals while minimizing the number of counter stages. The circuitry shown demonstrates the following characteristics for the leads indicated:

1. The F lead goes high 6 milliseconds after the SIG lead goes high and remains high for 152 milliseconds after the SIG lead goes low. 2. The G lead goes high 192 milliseconds after the E lead goes high and remains high until the E lead goes low. 3. The HL lead goes low 504 milliseconds after the E lead goes high and does not go high again until the E lead goes low. 4. The CT lead goes high six milliseconds after the SIG lead goes high (precut) and remains high for 534 milliseconds and then goes low (on-hook cut). The CT lead goes high again when the E lead goes low and remains high for 122 milliseconds and then goes low (off-hook cut).

In describing the functioning of that portion of the circuitry of FIG. 2 which controls the F lead, it is assumed initially that the SIG, E and SUP leads are low. It is also assumed that the counter 201 is initially at a count of 19 and that gate G22 complement is high. This condition forces the CF flip-flop to reset and the F lead to be low. When the SIG lead goes high, the counter 201 resets immediately. If the SIG lead remains high for six milliseconds, the SUP lead goes high, causing the CF flip-flop to set. This action causes the F lead to go high. The circuitry remains in this state until the SIG lead goes low at which time gate G1 complement goes high, causing counter 201 to up-count. When the counter reaches the count of 19 or 152 milliseconds, gate G22 complement goes high, causing the CF flip-flop to reset which causes the F lead to go low and the counter to halt. The circuit remains in this state until the SIG lead makes another transition. The F lead therefore goes high 6 milliseconds after the SIG lead goes high and times high for 152 milliseconds after the SIG lead goes low.

The G and HL leads are controlled by the counter 202. Assume the E lead is low initially and that counter 202 has been reset. The G lead is initially low and the HL lead is initially high. When the E lead goes high, gate G3 complement goes high, causing the counter 202 to begin to up-count. When the count of 24 is obtained (192 milliseconds) gate G25 complement goes high causing the CG flip-flop to set and the G lead to go high. The counter 202 continues to up-count until it gets to the count of 63 (504 milliseconds) at which time the HL lead goes low and the counter stops. When the E lead goes low (E' high), the counter 202 is cleared, the HL lead goes high and the CG flip-flop is reset so that the G lead goes low. THe circuit remains in this state until the E lead changes state again. The G lead therefore times low or 192 milliseconds and then goes high, and the HL lead times high for 504 milliseconds and then goes low in response to a steady high E lead transition.

It is to be understood that the embodiment described herein is merely illustrative of the principles of the invention. Various modifications thereto may be effected by persons skilled in the art without departing from the spirit and scope of the invention.

What is claimed is:

1. A multifunction pulse regeneration circuit employing only a single digital timer comprising, in combination, first means including said timer for establishing an operate threshold delay, second means including said timer for establishing a release delay, third means including said timer for establishing a minimum break duration, fourth means including said timer for establishing a minimum make duration, and fifth means including said timer for establishing an idle condition holdover.

2. Apparatus in accordance with claim 1 wherein said timer comprises a synchronous up-down counter with overriding set and reset.

3. Apparatus in accordance with claim 2 including means for applying a clock signal to said timer.

4. Apparatus in accordance with claim 3 wherein each of said first, second, third, fourth and fifth means further includes a plurality of logic gates and flip-flops, input points, output points, means interconnecting said points by way of said clock, said gates and said flip-flops and means for applying said clock signal to said timer.

5. Apparatus in accordance with claim 4 wherein each of said gates comprises a NAND gate having a complementary output.

* * * * *